Aug. 30, 1966      W. S. NAGEL      3,269,214
FABRICATED TRUCK AND TRAILER AXLE HOUSING
Filed July 30, 1962      3 Sheets-Sheet 1
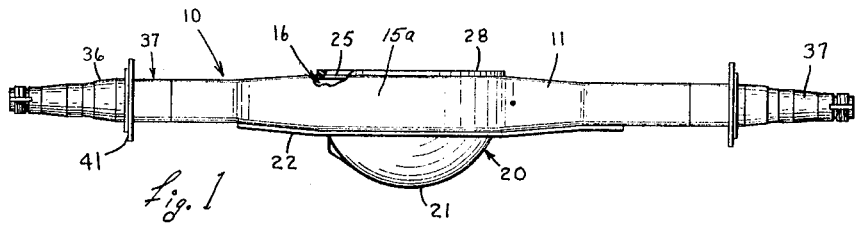
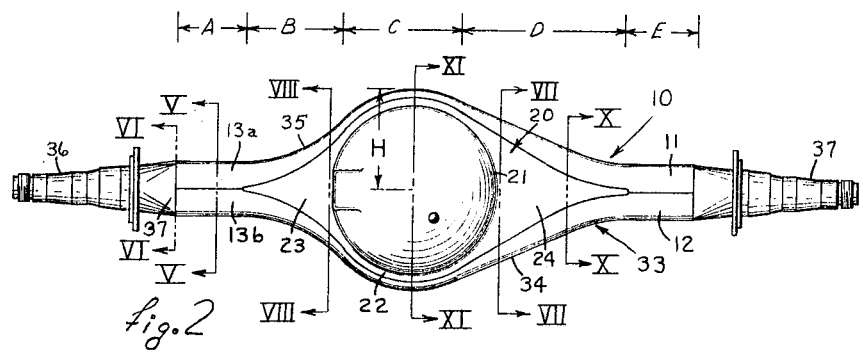
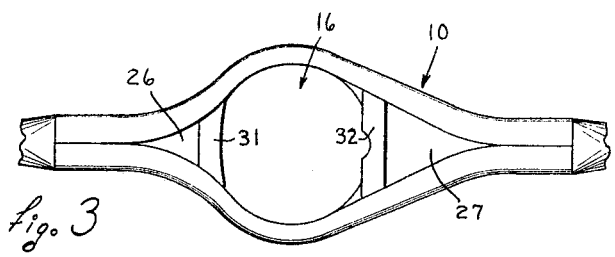
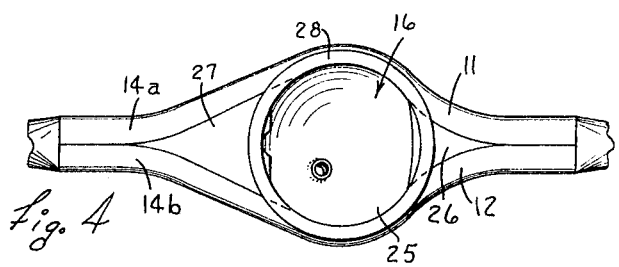
INVENTOR.
WILLIAM S. NAGEL
BY
Woodhams, Blanchard and Flynn
ATTORNEYS Aug. 30, 1966   W. S. NAGEL   3,269,214
FABRICATED TRUCK AND TRAILER AXLE HOUSING
Filed July 30, 1962   3 Sheets-Sheet 2
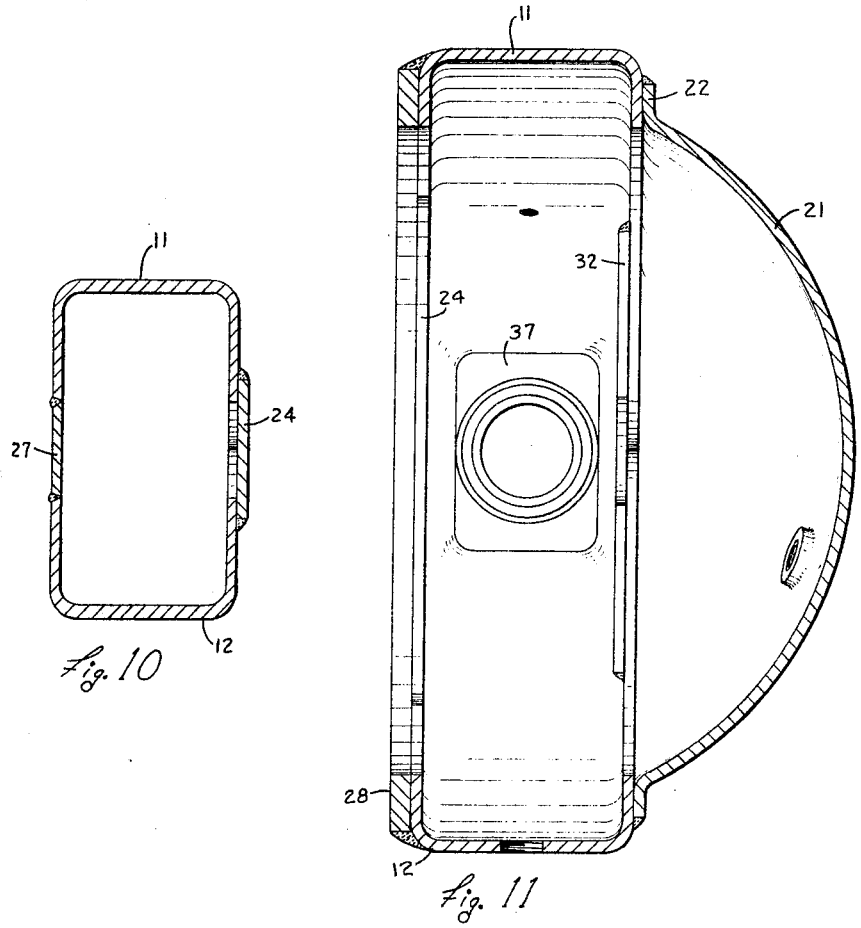
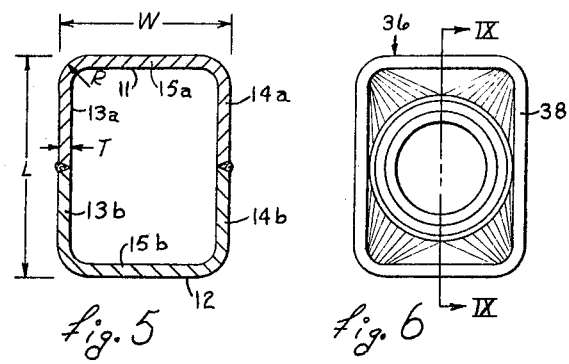
INVENTOR.
WILLIAM S. NAGEL
BY
Woodhams, Blanchard & Flynn
ATTORNEYS Aug. 30, 1966 W. S. NAGEL 3,269,214
FABRICATED TRUCK AND TRAILER AXLE HOUSING
Filed July 30, 1962 3 Sheets-Sheet 3

INVENTOR.
WILLIAM S. NAGEL
BY
Woodhams Blanchard and Flynn
ATTORNEYS

United States Patent Office 3,269,214
Patented August 30, 1966

1

3,269,214
FABRICATED TRUCK AND TRAILER
AXLE HOUSING
William S. Nagel, Fraser, Mich., assignor to Eaton Yale
& Towne Inc., a corporation of Ohio
Filed July 30, 1962, Ser. No. 214,795
9 Claims.  (Cl. 74—607)

This invention relates to an axle construction, particularly to a truck or trailer axle housing which is lighter in weight and lower in cost to manufacture than prior art axles designed for the same rated load. This application is a continuation-in-part of application Serial No. 16,464, filed March 21, 1960, now abandoned.

It is desirable to reduce the weight of a truck or trailer axle structure, without reducing its strength, so that a greater payload can be carried by the vehicle. A wide variety of truck and trailer axle housing structures have been suggested and, while many of these are generally satisfactory in service, continuing efforts have been made to reduce the weight and cost of manufacture of axle housings. However, for several years the art has been unable to effect further reduction in the weight of axle housings without substantially increasing the manufacturing costs and/or reducing the strength and stiffness of the axle structure or otherwise reducing its ability to satisfactorily meet its service requirements. Any acceptable reduction in axle housing weight must be effected without substantial increase in the manufacturing cost and desirably should effect a decrease thereof since manufacture of axle housings is a highly competitive business and initial cost is a prime factor in effecting sales.

Accordingly, it is one object of the invention to provide an improved axle housing which is lighter in weight and less expensive to manufacture than conventional axle housings designed for the same rated load.

It is a further object of the invention to provide an improved axle housing, as aforesaid, in which the cross-sectional shape and size of the axle housing are such that it is relatively light in weight for its strength and is inexpensive to manufacture.

It is a further object of the invention to provide an improved axle housing, as aforesaid, whose measurements lie within certain critical ratios so that the axle housing has satisfactory strength and still achieves the weight havings and cost savings set forth above.

It is a further object of the invention to provide an axle housing in which a one-piece, tubular alloy steel spindle is provided at each end thereof to provide still greater weight reduction without substantial increase in manufacturing cost for a given load-carrying ability.

It is a further object of the invention to provide an improved axle housing, as aforesaid, in which the spindles are cold formed from steel tubing of the appropriate size.

It is a further object of the invention to provide an improved truck axle having a novel cover arrangement for the banjo portion thereof, the banjo portion preferably being longitudinally offset from the exact longitudinal center of the axle housing.

It is a further object of the invention to provide an improved axle, as aforesaid, which can be manufactured using conventional equipment and metal-forming techniques.

Other objects and advantages of the invention will become apparent to those acquainted with equipment of this type upon reading the following disclosure and inspecting the accompanying drawings.

In the accompanying drawings:

FIGURE 1 is a partially broken-away, top plan view of a truck axle embodying the invention.

FIGURE 2 is an elevational view of the truck axle from the rear side thereof.

2

FIGURE 3 is a fragment of FIGURE 2 with the banjo cover removed.

FIGURE 4 is an elevational view of the central portion of the truck axle from the front side thereof.

Figure 12:
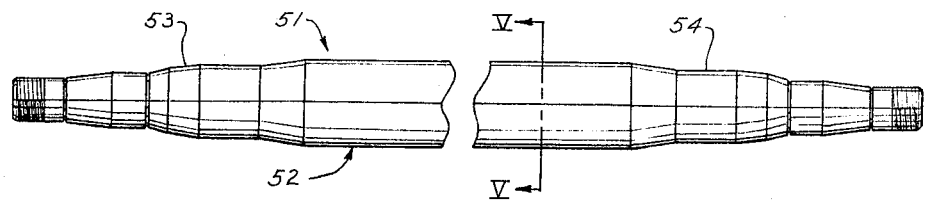

FIGURE 5 is a sectional view taken along the line V—V in FIGURE 2 or in FIGURE 12.

FIGURE 6 is a sectional view taken along the line VI—VI in FIGURE 2.

Figure 7:
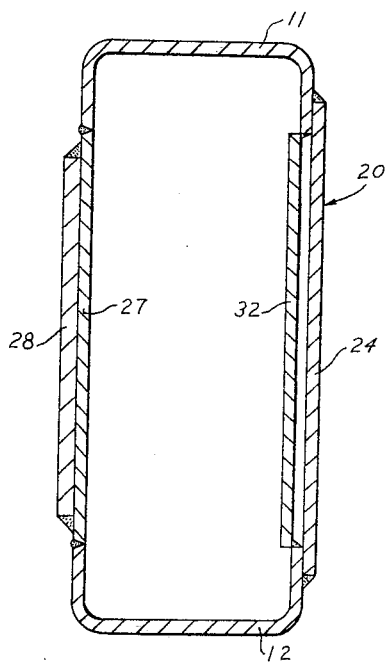

FIGURE 7 is a sectional view taken along the line VII—VII in FIGURE 2.

Figure 8:
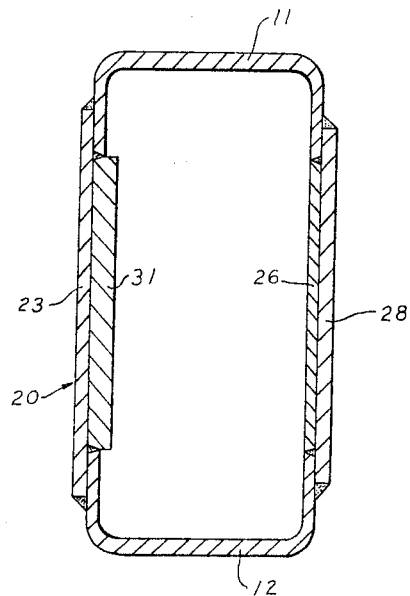

FIGURE 8 is a sectional view taken along the line VIII—VIII in FIGURE 2.

Figure 9:
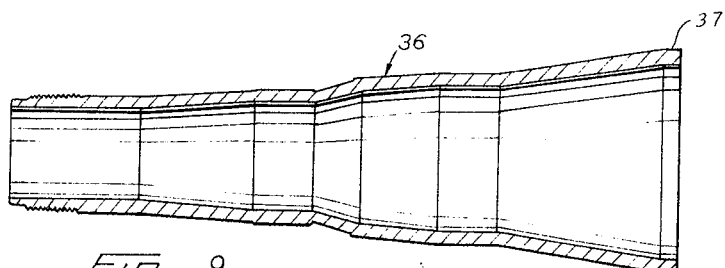

FIGURE 9 is a sectional view taken along the line IX—IX of FIGURE 6.

FIGURE 10 is a sectional view taken on the line X—X of FIGURE 2.

FIGURE 11 is a sectional view taken on the line XI—XI of FIGURE 2.

FIGURE 12 is a side elevational view of a trailer axle embodying the invention.

*General description*

In general, the invention provides a tubular axle housing applicable to trucks or trailers wherein the axle is of from 13,000–25,000 pound load rating and has a radius in the blend area between the bowl and the portion of constant major dimension or height, of from about 0.8 to about two times the rise from the portion of constant major dimension or height, to the bowl and wherein further the arms portions have a cross-sectional shape comprising a rectangle having rounded corners. While selecting a suitable cross section for the arm portion of the axle the interrelation between the arms and the rest of the housing must eventually be considered, initially the section efficiency of the arm can be considered separately. Thus, while the invention has been developed within the scope indicated, and for use with an axle of the type and characteristics indicated, such invention and hereinafter following discussion are directed toward the design of said arm portions.

According to the invention, the ratio of the minor dimension to the major dimension of the arm portions is from about 0.7 to about 0.9 to 1.0. In use, the minor dimension is horizontally disposed and the major dimension is vertically disposed. The ratio of the major dimension of the arm portions to the wall thickness thereof is between about 14 and 21 to 1. The ratio of the radius of the rounded corners of the outside surface of the arm portions to the wall thickness thereof is between about 2 and 4 to 1. One-piece, alloy steel, tubular spindles are connected to the opposite ends of the housing. The spindles are cold formed to the desired shape from tubular stock.

As applied specifically to truck axles, the invention further provides a novel structural arrangement at the banjo portion thereof including a one-piece banjo cover closing the rear wall of the banjo chamber which cover is formed from a diamond-shaped piece of plate stock and has a dished, circular, central portion. Two pie pieces, which are preferably formed from the scrap produced in forming the above-mentioned diamond-shaped plate stock, are provided to close off the two substantially triangular portions at the opposite axial ends of the opening in the front wall of the axle housing. Thus, the banjo portion of the housing has a substantially circular opening in the front wall thereof and is closed at the rear thereof by the banjo cover. The differential gearing of the vehicle is received within the banjo chamber and the carrier thereof is affixed around the peripheral edge of the aforesaid opening. The banjo is preferably in many cases offset longitudinally from the exact longitudinal center of the axle housing and the long arm portion of the housing is preferably joined to the banjo portion by a blend section which includes a blend radius and a substantially straight wall.

The foregoing described relationships and dimensional data for the arm portions of the axle may be further and in a more general manner embodied in the formula $$\frac{\text{section modulus}}{(\text{cross-sectional area})^{3/2}} = 0.62 - 0.68$$

The full meaning and use of this formula will be set forth hereinafter.

Detailed description

Referring to FIGURES 1 through 11 of the drawings, there is shown a truck axle housing 10 for a popular size of truck axle, namely, about 13,000 to 25,000 pounds rating, which, because of the space usually required for the differential gearing as compared to the diameter of the axle, usually involves a rather fixed relationship between the size of the central or banjo portion of the axle and the vertical dimension of the arm, or fixed height, portions of the axle. The axle of the invention is comprised of two similar, opposed, cold formed, channel-shaped members 11 and 12 having aligned, corresponding side walls 13a, 13b and 14a, 14b and opposed webs 15a, 15b (FIGURE 5). The free edges of the corresponding side walls 13a, 13b and 14a, 14b are welded together at the opposite ends of the housing 10 to provide substantially straight arm portions A and E. It is important to note that the arm portions A and E constitute an extremely important design area in a truck axle and the significant relationships which are hereinafter set forth pertain specifically to the arm portions A and E. The members 11 and 12 are bowed away from each other in their central sections to provide two blend portions B and D and a central, partially circular, banjo portion C (FIGURE 2). The respective radii of the two blend portions B and D are equal to each other and are between about 0.8 and 2.0 times the rise dimension between the axle and the banjo portion, the term "rise" being a convenient way of referring to one-half the difference between the vertical dimension of said banjo portion and the vertical dimension of said arm portions. Preferably such radius will be approximately equal to said rise dimension. Spring seats (not shown) are secured, as by welding, to the arm portions A and E in conventional manner and serve to support the springs which connect the axle housing to the frame of the vehicle in a conventional manner. As shown in FIGURE 1, the webs 15a and 15b are enlarged in the blend portions B and D and in the banjo portion C to provide suitable space for housing the differential of the vehicle within the chamber in the banjo portion.

The width of the side walls 13a, 13b, 14a and 14b are correspondingly decreased where the webs 15a and 15b are widened whereby the members 11 and 12 can be fabricated from rectangular sheets which further minimizes the cost of manufacture thereof.

It would appear from a theoretical standpoint that the most efficient cross-sectional shape of the arm portions of an axle housing in terms of the load that can be supported thereby for a given weight thereof would be one having a minimum wall thickness and maximum width and depth. However, this approach is limited for several reasons which are set forth as follows. When the wall thickness of the axle housing is decreased, the blend radius, that is, the curved portion connecting the arm portion to the banjo portion, tends to straighten out under a load and creates an area of localized stress.

It is further essential for the purposes of the invention that the arm portions A and E of the housing 10 be substantially rectangular in cross section with rounded corners, the larger dimension being vertically disposed in use. This shape presents adequate spring clip bearing surface and resistance to crushing under the U-bolts utilized to affix the springs to the spring pads while at the same time giving good stiffness and torsional and flexural strength. It also has advantages as regards the size of the spindle, as hereinafter described, which is used therewith and, further, allows the use of a somewhat lighter flange for mounting the brake structure than might otherwise be possible.

It has been determined that certain dimensional relationships in the arm portions A and E are of critical importance and must be maintained in order to achieve the advantages of the invention. In particular, with the blend radius in the portions B and D taken as above set forth, the following dimensional relationships have been found to be essential to said arm portions to minimize areas of localized stress concentration which would otherwise lead to premature failures of the axle housing while at the same time providing a lesser axle housing weight.

Successful practice of the instant invention requires that the ratio of the minor dimension W to the major dimension L of the rectangle (see FIGURE 5) must be between about 0.7 and about 0.9 to 1.0. This relationship is important and necessary to provide maximum stiffness in the arms without any significant loss in torsional rigidity while maintaining adequate spindle strength and maximum operative vehicle spring length. This last-mentioned factor is extremely important because it is necessary to keep the distance between the spring U-bolts to a minimum since the portion of the spring between the bolts is confined and cannot be considered as an operative part of the spring.

The ratio of the major dimension L to the wall thickness T must be between about 14 and 21 to 1. When this ratio is greater than about 21 to 1 stress risers due to section distortion become unduly high and neutralize any advantages gained by attempting such a high ratio. When the ratio becomes lower than about 14 to 1 the weight of the axle becomes too great.

The radius R of the outside surface of the corners must be between about 2 and 4 times the wall thickness T. Rounding the corners of the rectangle in the range set forth above minimizes localized areas of stress concentration and provides greater torsional strength in the arm than if the corners were rounded to a radius of lesser than about two times the wall thickness. Making the radius of the corners greater than about four times the wall thickness would result in a loss of spring clip bearing area and an undesirable increase in the overall width W of the rectangle.

It has also been determined that the ratio of the section modulus of the arm portion to the total cross-sectional area of the metal comprising the arm is a significant and important relationship. In order to practice the instant invention, this ratio must be between 1.28 and 1.45. This range is critical because it is in fact a measure of section efficiency. However, the maximum efficiency is limited at 1.45 because any value above this results in stress risers which are not tolerable in practical axle design.

The members 11 and 12 are customarily formed of a suitable, relatively inexpensive steel, SAE 1030 or 1040 being preferred, heat treated to a hardness of between 22 and about 32 Rockwell C for maximum fatigue strength. Low carbon steel can also be used but with less satisfactory results.

The bowed central sections of the members 11 and 12 define a chamber 16 having a substantially circular middle portion with substantially triangular extensions at the opposite axial ends thereof.

A one-piece banjo cover 20 is formed of plate stock and has a dish-shaped central portion 21 surrounded by a flat peripheral edge region 22 which includes two substantially triangular extensions 23 and 24. The flat peripheral edge region 22 overlies the corresponding walls 13a and 13b of the members 11 and 12 and is welded thereto. Preferably, the banjo cover 21 is formed from a flat diamond-shaped piece which in turn is formed from a flat square or rectangular piece.

Two separate pie pieces 26 and 27 fit within the triangular extensions of chamber 16 in the front end wall of the housing and are secured, as by welding, to the corresponding side walls 14a and 14b of the members 11 and 12 and are coplanar therewith. Thus, the chamber 16 has a substantially circular entrance opening 25 in the front wall of the housing and is closed by the banjo cover 21 in the rear wall thereof. The pie pieces 26 and 27 are desirably formed of the material left from the formation of the diamond-shaped piece referred to above, which would otherwise be scrap.

A ring 28 is secured to the coplanar pie pieces 26 and 27 and the side walls 14a and 14b of the members 11 and 12 and encircles the opening 25. The ring 28 serves as a means for connecting the axle housing to the differential carrier (not shown) of the vehicle.

Filler plates 31 and 32 are secured, as by welding, to the internal surface of side walls 13a and 13b and extend across the base edge portion of the triangular extensions of chamber 16. These plates serve to support the axle gear carrier (not shown) under axle driving loads.

The bowed central portions of the members 11 and 12 are preferably offset longitudinally from the exact longitudinal center of the housing 10 in order to increase the rigidity thereof.

The radius of curvature of arcuate surface 35 is formed as the largest possible radius which has a tangential relationship with the surface of web portion 15a and the central portion of banjo 21. The radius of curvature of arcuate portion 33 is identical to or nearly identical to the radius shown at 35 and is arranged so that straight wall portion 34 is tangent to the central portion of banjo 21 and arcuate portion 33. Arcuate portion 33 is also tangent to arm portion 12. These relationships can be clearly observed in FIGURE 2. It is significant that the radius of arc 33 is equal to the radius of arc 35 because the minimum radius is established on the short side and determines the stress riser. For stress reasons, the radius 33 should not be less than radius 35 and if radius 33 is greater than radius 35 there will be less stiffness along portion D of the axle.

One-piece, tubular spindles 36 and 37 are secured, as by welding, to the ends of the housing 10. The spindles 36 and 37 are identical so only spindle 36 will be described in detail herein. At its inner end, the spindle 36 has a portion 38 (FIGURE 6) of rectangular section with rounded corners corresponding to the cross-sectional shape of the arm section A of the housing 10. The spindle 36 is formed to provide progressive circular sections of decreasing external diameter toward the outer end thereof which sections are utilized for mounting the brake structure and wheels (neither shown) of the vehicle in a conventional manner. A flange structure 41 is secured to the spindle for the purpose of mounting the brake structure thereon.

According to the invention, the spindle is made of an alloy steel, relatively thin-walled tubing which is cold formed in a die to the desired shape. Preferably, the alloy steel is SAE 4130 or 1330. While the use of alloy steel for the spindle represents additional cost per pound, it has been found that additional cost per pound is more than made up by the fact that a much lesser weight of spindle may be used because of the greater strength of alloy steel spindles. The wall thickness of the portion 38 of the spindle 36, is substantially the same as the thickness of the arm portions A and E. While the wall thickness of the tubing may increase somewhat toward the outer end thereof, any such increase is small, usually less than 0.1 inch. It is to be noted that in relatively smaller size axles, it is very desirable to build up the spindle wall thickness, especially at the location of the inner bearing of the vehicle wheel.

Referring now again to the above-designated formula the same being restated here for convenience in reference, $$\frac{\text{section modulus}}{(\text{cross-sectional area})^{3/2}} = 0.62 - 0.68$$

This formula comprises a further refinement, and more generalized statement, of the dimensional relationships above set forth in the arm, or constant vertical dimension, portions of the axle and accordingly has been found to define a critical relationship of dimensional values which are effective for axles within the 13,000–25,000 pound range of rate load, and with blend radii as above set forth in sections B and D thereof, to provide an axle which is of very low weight and yet which will avoid unacceptable stress risers in the lower corners of the rectangular area adjacent the banjo portion. The use of this formula has provided axles of 120 to 130 pounds weight and which are fully satisfactory for the rated load above indicated. Previous designed axles of the same rated capacity have been of the order of 170 to 180 pounds of weight.

In the formula:

(a) the term "section modulus" refers to the usual definition of section modulus, namely, the moment of inertia of a structural member divided by the distance from the neutral plane to the fiber carrying the greatest stress;

(b) the term "cross-sectional area" refers to the cross-sectional area of the axle metal in the parts A and E of said axles.

*Modification*

In FIGURE 12 there is shown a trailer axle housing 51 having a housing portion 52 and two spindles 53 and 54. The housing portion 52 is of substantially constant, rectangular cross section with rounded corners throughout its length corresponding in all respects with the shape of the arm portions A and E of the housing 10. The spindles 53 and 54 are cold formed of alloy steel in the same manner as spindles 36 and 37 previously described.

*Example*

Truck axles for a rated load of 16,000 pounds were formed in accordance with the invention of stock of 0.25 inch thickness. The arm portions A and E had a major dimension L of five inches and a minor dimension W of three and seven-eighths inches. The radius R of the corners was three-quarters of an inch. The blend radius was three-quarters of an inch and the rise dimension was six and one-half inches. The axle weighed about 125 pounds. Axles of this construction were subjected to a testing procedure in which a test load of value twice the rated load, that is 32,000 pounds, was applied twenty times per second. It was found that axles manufactured in accordance with the invention remained intact up to 250,000 to 400,000 test cycles. Similarly rated commercially available axles were similarly tested and it was found that such axles capable of the same performance weighed from 170 to 200 pounds.

Examples specifically illustrating the use of the above formula on these same axles are:

| Axle | Factor | Rating, lbs. | Weight | Average Stress | Peak Stress | Comment |
|---|---|---|---|---|---|---|
| 1 | .45 | 16,000 | 170 | 22,000 | 22,000 | Too heavy. |
| 2 | .59 | 15,000 | 145 | 21,000 | 21,000 | Somewhat heavy. |
| 3 | .66 | 15,000 | 110 | 21,500 | 22,500 | Acceptable. |
| 4 | .67 | 16,000 | 125 | 21,000 | 22,500 | Do. |
| 5 | .84 | 16,000 | 119 | 20,200 | 27,000 | Peak stress too high. |

In the above table the following definitions apply:

"Factor" is the value obtained by inserting the dimensional relationships of a given axle into the above formula.

"Rating" is the load which the axle is designed to carry. In the above chart the ratings have all been chosen in the 15,000–16,000 pound range in order that the results will be comparable. Because of such load ratings the rise dimension was approximately six and one-half inches and accordingly the average blend radii in parts corresponding to parts B and D of the axle shown in FIGURE 2 was approximately ten inches.

"Weight" is the total weight of the axle being examined.

"Average stress" is the average of the stresses across the bottom of the constant diameter portion of the axle on either side of the banjo portion.

"Peak stress" is the maximum stress appearing in the bottom of the axle in the constant diameter portion thereof on either side of the banjo section, said peak stress appearing primarily in the lower outside corners of a cross-section of said portions.

Accordingly, it will be seen that the invention provides an axle capable of meeting the same performance requirements as commercially available axles but weighing only seventy to seventy-five percent as much. This weight saving has been effected without sacrificing performance and without increasing the cost of manufacture. In fact, it has been found that the cost of manufacture has been substantially reduced.

While particular preferred embodiments of the invention have been described hereinabove, it will be understood that the invention includes such modifications or changes therein as lie within the scope of the appended claims.

What is claimed is:

1. An axle housing made from sheet material and including a banjo portion and aligned tubular portions and sloping portions connecting said banjo portion with said tubular portions wherein the radius of the blend from the tubular portion to said sloping portions is approximately 0.8 to 2.0 times the rise from the tubular portion to the banjo portion and wherein the cross-sectional area of said tubular portions is substantially rectangular with rounded corners and conforms to the formula $$\frac{\text{section modulus}}{(\text{cross-sectional area})^{3/2}} = 0.62 - 0.68$$

2. An axle housing comprising a banjo portion, sloping portions and a tubular portion having arm portions of rectangular cross section with rounded corners, wherein the radius of the blend from the tubular portion to said sloping portions is approximately 0.8 to 2.0 times the rise from the tubular portion to the banjo portion and wherein the ratio of the minor to the major dimension of said arm portions being between about 0.7 and about 0.9 to 1.0; and the ratio of the major dimension of said arm portions to the wall thickness thereof being between about 14 and about 21 to 1.

3. An axle housing according to claim 2 wherein the radius of curvature of the outside surface of the corners of said arm portions is from 2 to 4 times the wall thickness thereof.

4. An axle housing comprising a tubular member having arm portions of rectangular cross section with rounded corners, the ratio of the minor to the major dimension of said arm portions being between about 0.7 and about 0.9 to 1.0; and the ratio of the major dimension of said arm portions to the wall thickness thereof being between about 14 and 21 to 1; a tubular, one-piece, cold-formed spindle permanently affixed to each end of said member, the adjacent end of said spindle having a rectangular cross section with rounded corners corresponding to the cross section of said arm portions, said spindle having progressive sections of circular cross section and of smaller external diameter toward the other end thereof.

5. A truck axle housing according to claim 4 wherein said sections have substantially equal blend radii which begin to bow away from each other at equal distances from the longitudinal center of the axle member and the blend radii on the longer portion of the axle member are connected by straight sections to the banjo portion of the axle member.

6. A truck axle housing comprising a pair of opposed, elongated channel-shaped sections having rounded corners, the central axial portions of said sections being bowed away from each other to define a banjo portion and the axial end portions thereof being welded to each other to thereby define an integral axle member which has end portions which are substantially rectangular in cross section and have rounded corners, the ratio of the minor to the major dimension of the arm portions of said member being between about 0.7 and 0.9 to 1.0; and the ratio of the major dimension of the arm portions of said member to the wall thickness thereof being between about 14 and about 21 to 1; the bowed central portions of said axle member defining an opening; a banjo cover secured to corresponding side walls of said sections and covering one end of the opening in said axle member; a pair of tubular, one-piece, cold-formed, alloy steel spindles of substantially uniform wall thickness permanently affixed respectively, to the ends of said axle member, the ends of said spindles adjacent said axle member having a rectangular cross section with rounded corners corresponding to the cross section of said arm portions of said axle member, said spindle having progressive sections of circular cross section and of smaller external diameter toward the other end thereof.

7. An axle housing comprising a tubular member having an enlarged portion intermediate the ends thereof and arm portions of rectangular cross section on either side of said enlarged portion, the ratio of the section modulus of said arm portions to the cross-sectional area of the material comprising said arm portions being between 1.28 and 1.45 to 1, and the radius of curvature of the outside surface of the corners of said rectangular cross section being from 2 to 4 times the wall thickness thereof.

8. An axle housing made from sheet material and including a banjo portion and aligned tubular portions and sloping portions connecting said banjo portion with said tubular portions, said banjo portion being offset from the center point between the ends of said tubular portions, in which the radius of the blend from the tubular portion to said sloping portion on both sides of said banjo portion is between approximately 0.8 to 2.0 times the rise from the tubular portion to the banjo portion, characterized as follows:

the cross-sectional shape for the tubular portions is that of a hollow rectangle with rounded corners in which the major dimension of the rectangle is vertically disposed in use;

the ratio of the minor dimension to the major dimension of said rectangular tubular portions lies between 0.7–0.9:1;

the ratio of the wall thickness of said tubular portion to the major dimension thereof is from 1 to 14–21; and the ratio of the radius of curvature of said corners to the wall thickness of said tubular portion is from 2–4:1;

whereby a substantial reduction in weight of said axle housing may be obtained without appreciably diminishing its load carrying capacity.

9. An axle housing made from sheet material having a banjo portion and aligned tubular portions, said banjo portion being offset from the center point between the ends of said tubular portions, the improvement comprising:

means defining a short portion and a long portion on either side of said banjo portion for connecting said banjo portion to said tubular portions, the cross-sectional shape of the tubular portions being that of a hollow rectangle with rounded corners in which the major dimension of the rectangle is vertically disposed in use, said short portion being substantially radiused from a first point of tangency with the tubular portion to which it is connected to a point of tangency with the banjo portion, and the long portion having a straight section extending away from a point of tangency with the banjo portion and an arcuate portion of a radius equal to that of the radiused portion of said short section extending from a point of tangency with said straight section to a second point of tangency with the tubular portion to which it is connected, the axle housing being characterized as follows:

the radius of the blend from the tubular portion to said straight section is approximately 0.8 to 2.0 times the rise from the tubular portion to the banjo portion;

the ratio of the minor dimension to the major dimension of said rectangular tubular portions lies between 0.7–0.9:1;

the ratio of the wall thickness of said tubular portions to the major dimension thereof is from 1 to 14–21; and the ratio of the radius of curvature of said corners to the wall thickness of said tubular portions is from 2–4:1;

whereby a substantial reduction in weight of said axle housing may be obtained without appreciably diminishing its load carrying capacity.

References Cited by the Examiner

UNITED STATES PATENTS

| | | | |
|---|---|---|---|
| 1,036,660 | 8/1912 | Lindsay | 74—607 X |
| 1,283,143 | 10/1918 | Fries | 74—607 |
| 2,204,287 | 6/1940 | Wilber | 74—607 |
| 3,015,238 | 1/1962 | Williams | 74—607 |
| 3,041,890 | 7/1962 | O'Brien | 74—607 |

FOREIGN PATENTS 717,527    10/1954    Great Britain.

MILTON KAUFMAN, *Primary Examiner.*

BROUGHTON G. DURHAM, *Examiner.*

W. S. RATLIFF, *Assistant Examiner.*